Aug. 21, 1945.　　　　　G. CANNOVA　　　　　2,382,973
FASTENER ASSEMBLY
Filed Jan. 19, 1944　　　　3 Sheets-Sheet 3

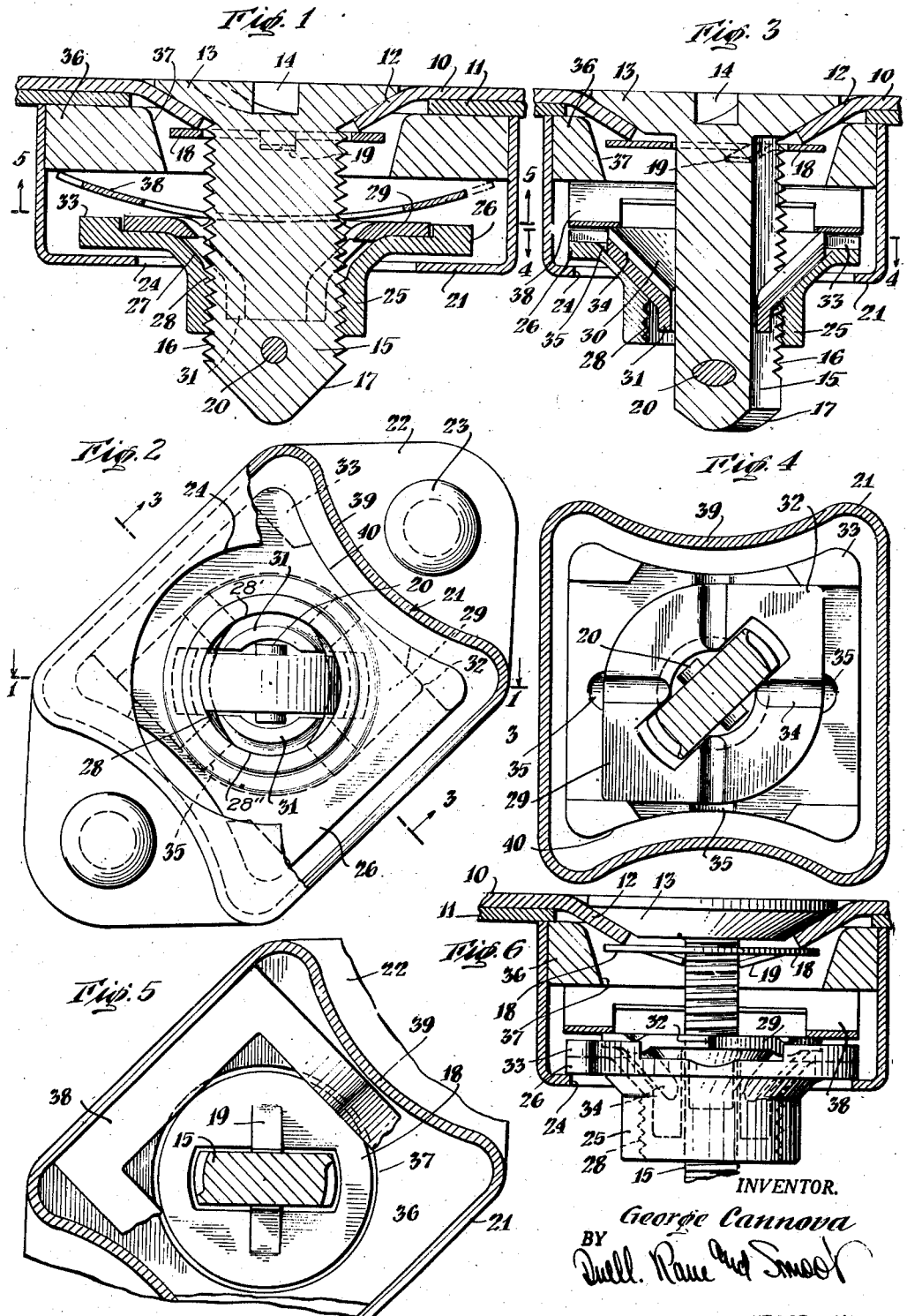

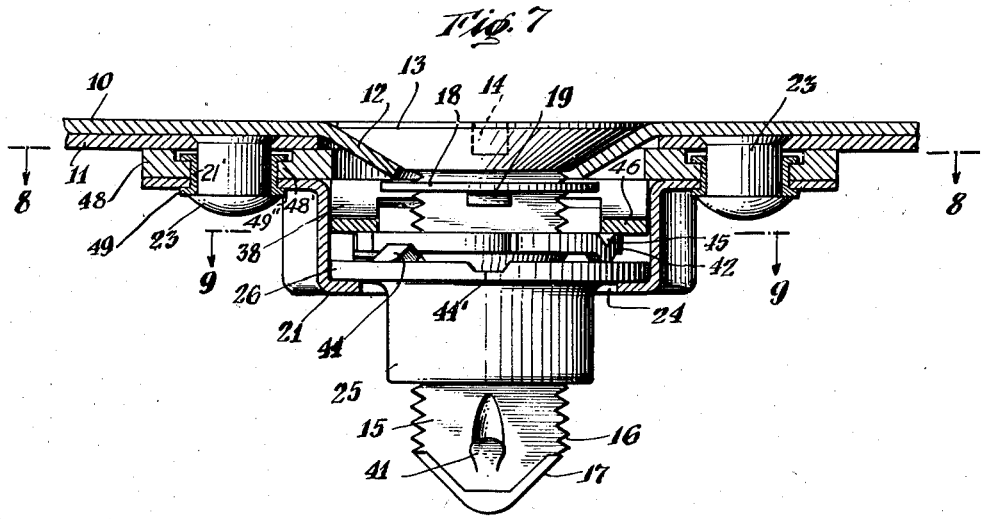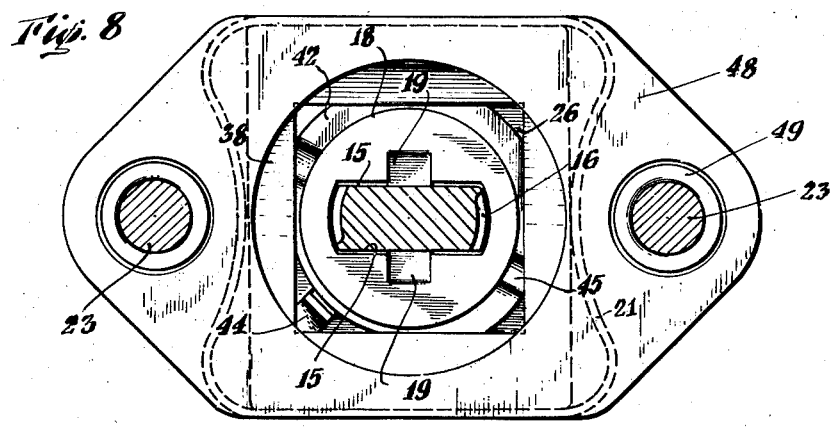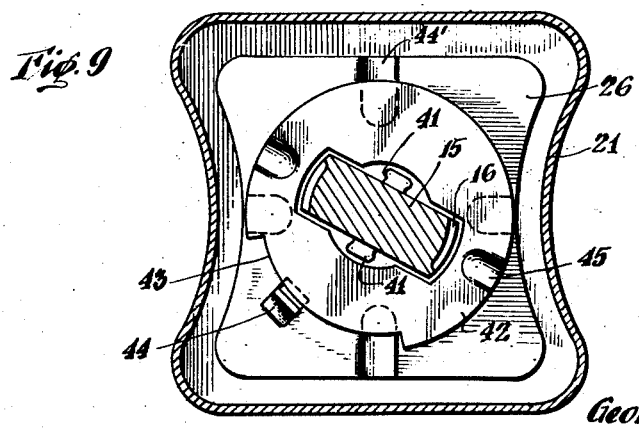

INVENTOR.
George Cannova
BY
ATTORNEYS

Patented Aug. 21, 1945

2,382,973

UNITED STATES PATENT OFFICE 2,382,973

FASTENER ASSEMBLY

George Cannova, Flushing, N. Y., assignor to Camloc Fastener Corporation, New York, N. Y., a corporation of New York Application January 19, 1944, Serial No. 518,794

16 Claims. (Cl. 24—221)

This invention relates to a structurally and functionally improved fastener assembly as well as a stud structure and a stud receptacle of improved design.

It is an object of the invention to provide a novel fastener assembly, the parts of which may be readily adjusted and without the necessity of replacement or physical alteration so that an operator may utilize assemblies of duplicate type under widely varying conditions of sheet thickness or—in fact—different conditions of installation. Consequently, an assembly of a somewhat universal nature is furnished.

This has the advantage of reducing to a material extent the time required for installation of the fastener as well as the operative coupling of members or sheets to be secured against movement by the assembly.

Moreover it has the advantage of making it unnecessary for an operator to have available an assortment of different sized fasteners to meet conditions peculiar to different installations.

A further object is that of providing an assembly in which the operator may adjust the parts according to the needs of a particular installation and without any conscious effort or expenditure of time being required other than that which would normally be necessary to couple the parts of a fastener assembly.

A still further object is that of furnishing a unit of this type and in which the parts when once coupled will be substantially locked against accidental loosening or detachment from one another; the parts of the collar moreover being maintained in a position such that no rearranging of the same will be necessary when a stud is to be coupled thereto.

Another object is that of furnishing a fastener which will embody relatively few parts, each individually simple and rugged in construction; these parts being capable of manufacture by automatic machinery and methods and being susceptible of assembly by similar methods to furnish a unitary structure operating over long periods of time with freedom from all difficulties.

With these and other objects in mind, reference is had to the attached sheet of drawings illustrating practical embodiments of the invention, and in which:

Fig. 1 is a sectional side view of the fastener assembly taken along the lines 1—1 in the direction of the arrows of Fig. 2;

Fig. 2 is a bottom plan view thereof with said parts broken away to disclose underlying constructions;

Fig. 3 is a transverse sectional view taken along the lines 3—3 and in the direction of the arrows as indicated in Fig. 2;

Fig. 4 is a sectional view taken along the lines 4—4 in the direction of the arrows as indicated in Fig. 3;

Fig. 5 is a sectional view taken along the lines 5—5 in the direction of the arrows as indicated in Fig. 1;

Fig. 6 is a view similar to Fig. 1 but showing certain of the parts in elevation and also illustrating the assembly 90° from the section along which Fig. 1 is taken;

Fig. 7 is a side elevation partly in section of an alternative form of construction;

Figure 10:
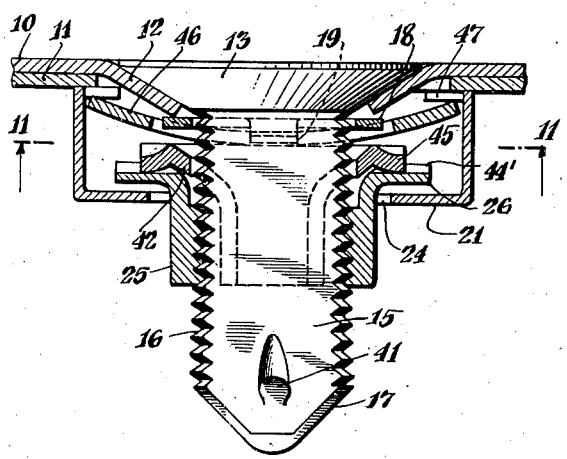
Figure 12:
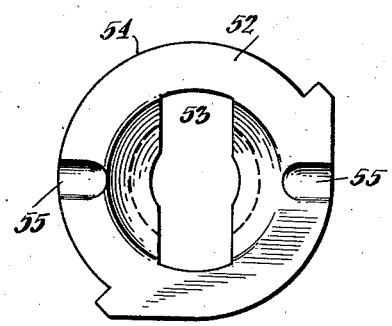
Figure 11:
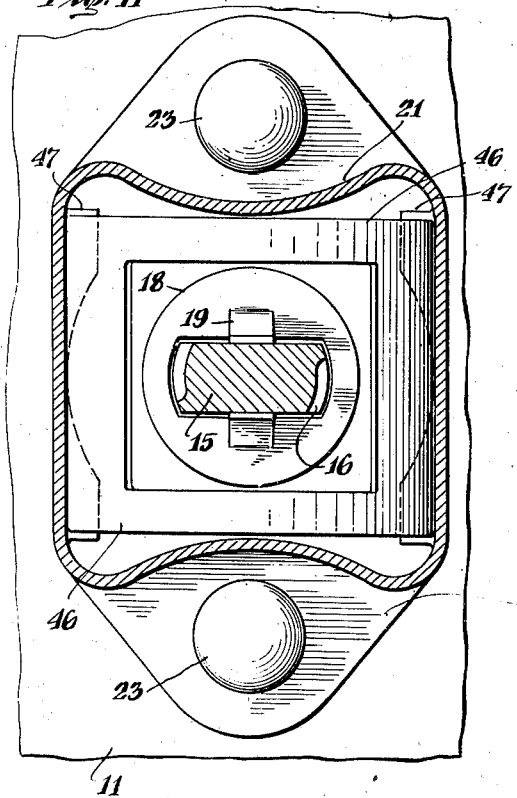
Figure 13:
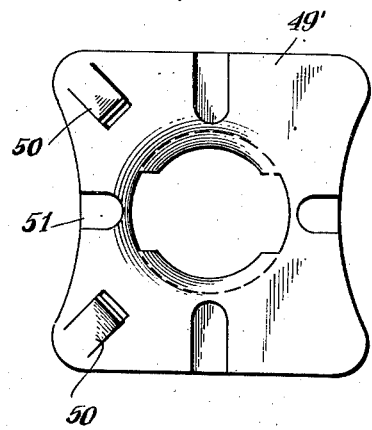

Figs. 8 and 9 are sectional plan views taken respectively along the lines 8—8 and 9—9 in the direction of the arrows as indicated in Fig. 7;

Fig. 10 is a sectional side view of a further form of construction;

Fig. 11 is a bottom plan view taken along the lines 11—11 and in the direction of the arrows as indicated in Fig. 10;

Fig. 12 is a plan view of an alternative form of locking plate which may be employed; and Fig. 13 is a view similar to Fig. 12 but showing the structure of a nut which is to be associated with the plate of Fig. 12.

The present invention aims to provide an assembly of what might be termed the universal type. In other words, a fastener constructed in accordance with the present teachings will, when associated with members to be joined, be capable of readily attaching those members to each other and securing them against relative movements irrespective of variation in sheet thickness and other factors resulting in greater or lesser distances existing between the engageable parts of the assembly. Accordingly, a great amount of time and expense will be saved in that it will be unnecessary to have available stud members of different lengths and to replace by trial and error, or otherwise, one stud member for another.

Thus, as shown in the attached drawings, the assembly conveniently may be employed to couple members 10 and 11 in the form of sheets. In such case, both sheets are apertured and the outermost sheet is preferably dimpled as shown at 12 to define a depressed portion adjacent its aperture. Accordingly, the head of the stud may be recessed within this dimple so that a substantially uninterrupted outer surface is presented. The stud as shown in Figs. 1 to 6 may include a head 13 conveniently formed with a groove 14 to receive the end of a manipulating tool. The under-face of the head is preferably flared at an angle corresponding to the angularity of the dimpling 12 so that the adjacent surfaces may have bearing throughout their entire operative faces.

A shank portion 15 extends below the head and is in the form of a relatively thin or narrow body having plain flat side faces and screw-threaded edge portions 16. The end of the stud may terminate in a point or nose 17 providing a guiding portion functioning in a manner hereinafter brought out.

A stud of this type should preferably be associated with the member mounting the same in a manner such that it will be free from accidental detachment therefrom. Therefore, in accordance with the present invention a stud-retaining plate 18 is employed and which conveniently is formed of a soft steel stock and has a slot through its body which will accommodate the shank of the stud. Also extending from this body, and as especially shown in Figs. 5 and 6 are tongues 19. The shank 15 may be provided with outstruck portions 20 conveniently formed by drilling the shank and press-fitting through the resultant bore, a section of steel wire or a rod. The ends of this rod extend slightly beyond the flat side faces of the shank. Accordingly, if the plate is formed of ordinary stock, the tongues 19 will spring back into position. Otherwise, they may be conveniently flattened in any desired manner, so that the space between these tabs is reduced sufficiently to prevent the plate 18 from passing beyond the projecting ends of the rod 20 or its equivalent. A detachment of the plate over the opposite end of the stud is, of course, precluded as a consequence of the head portion 13.

Now, with reference to the stud receptacle of the assembly, it will be observed that this is largely contained in a housing or shell 21. This shell is conveniently attached to the sheet 11 or any equivalent member through the instrumentality of wing portions 22 which may extend from the side faces of the shell and which receive rivets 23. The lower or inner face of the shell is formed with an opening 24 through which a nut 25 projects. This nut is formed with an outwardly flared flange 26 to provide a funnel-shaped portion 27 adjacent the point of juncture of the flange with the nut proper. The threads 28 of the nut are interrupted by opposed grooves 28' and 28", and the distance between the base portions of these grooves is slightly in excess of the width of the stud, i. e. the distance between its threaded side edges 16.

With a view to providing a structure which will restrain the shank from movement with respect to the collar assembly, and when the parts have been brought to occupy proper relative positions, a locking or detent structure is conveniently employed. As shown, this structure may include a plate 29 which has rotatable bearing with the flange 26 of the nut and which is tapered to provide a cup portion 30. The cup portion may be continued in the form of a tubular extension 31 lying within the bore of the nut. It is to be noted that both of these portions are formed with a slot, the dimensions of which are such that the shank 15 may readily pass through the same.

The plate 29 is preferably formed with extensions 32, as particularly illustrated in Fig. 4. Adjacent its corners, the flange 26 of the nut may be provided with upwardly projecting portions 33. These, in conjunction with the extensions 32, will act as stops limiting the rotation of the plate with respect to the nut. Moreover, as especially shown in this figure, the plate is formed with inwardly extending ribs 34 conveniently spaced 90° apart throughout the circumference thereof. These engage with grooves or notches 35 formed in the outer face of the flange 26 and/or funnel portion 27. It therefore follows that a detent structure is provided such as will restrain rotational movements of the plate 29 with respect to the nut and when the latter occupies predetermined positions.

The shell or housing 21 conveniently has a spacer member 36 within its body. This member lies adjacent the sheet or mounting 11 and is formed with an opening preferably in excess of the aperture defined by the dimple. Also, as indicated, the side edges 37 of this opening may extend at an angle. A spring in the form of a quadrangular frame 38 bears against the spacing member and acts against the plate 29. In this manner, the latter is normally maintained in contact with the outer face of the nut and such nut bears in contact with the shell adjacent its aperture 24. The spring 38 is not snugly fitted into the shell, but has limited movement therein as shown by the dotted line.

It is to be noted that the area of this aperture is materially in excess of the diameter of the nut 25. Accordingly, the nut may, within limitations, be shifted with respect to the shell or housing. Consequently a floating structure is furnished. The sides of the shell may be dished or curved as indicated at 39 and the adjacent edges of the nut may be formed with a corresponding curvature as indicated at 40. Thus the parts may, within limits, be shifted with respect to each other. However, under all conditions, the adjacent edges of the nut flange and the shell will extend substantially parallel with respect to each other.

Using an assembly of this nature, it will be understood that the stud is primarily introduced through the aperture of the sheet or other member 10. Thereafter the retainer plate 18 is associated with the same to prevent accidental detachment of the stud. It being assumed that the collar assembly has been attached to the sheet 11 or its equivalent, the two sheets are brought into face-to-face contact and with their apertures in substantial alignment. The stud is thereupon projected, and the nose portion 17 of the same will contact the locking plate and adjacent parts of the nut so as to center the latter with respect to the stud. This may involve a certain amount of shifting of the nut with respect to its shell, but due to the proportioning of the parts this is entirely permissible.

In projecting the stud, it is of course obvious that the latter enters the opening or slot formed in the plate 29. The plate is maintained in proper position to receive the stud because of the detent structure. In its projection the threaded edge portions 16 of the shank will ride within the grooves or interrupted thread portions of the nut.

This movement of the parts will continue until the head 13 of the stud bears firmly against the outer surface of the sheet or member 10. Under these circumstances, the stud will have been shifted axially with respect to the nut and to a position where it is fully projected. The operator may now turn the stud by introducing a screw driver or any other suitable implement into the groove 14 and rotating the head 13. Such rotation will obviously result in a turning of the shank with respect to the nut and so that the threads 16 will engage with the threads 28. Also, such turning will result in the plate 29 rotating with the shank. As a consequence of this rotation, the detent or locking structure provided by the outstruck portions 34 and grooves 35 will become inoperative. More particularly, the outstruck portions will ride up onto the face of the depressed portion of the flange 26 as shown in Fig. 6. Rotation of the parts will continue until the detents against become operative.

With the parts proportioned in the manner shown, the rotation will be through substantially 90°. Upon the detent structure's again becoming operative, the stop provided by the extended portions 32 in cooperation with the projections 33 will prevent a further turning of the parts. Incident to the foregoing operation, the nut will, of course, ride upwardly along the shank and as especially shown in Figs. 1 and 3. Under these circumstances, the spring 38 will have been compressed to an almost maximum extent and the edges of the spring will have ridden over the faces of the spacer 36 to a point at which they may bear against the adjacent portions of the shell or housing. Thus, the several parts of the structure are in effect locked under a condition of maximum tension. Consequently, the sheets are maintained against any movement with respect to each other.

Due to the detent or locking structure furnished, an accidental loosening of the parts incident to vibration or otherwise is substantially precluded. On the other hand, if it is desired deliberately to uncouple the parts, this may readily be accomplished by simply rotating the shank throughout substantially an angle of 90° and in the direction permitted by the stop. Under these circumstances, the threaded side stud edges which have been positioned substantially midway between the grooves or interrupted portions of the threads 28 will again be aligned with these grooves. Under these circumstances, there is no restraint upon axial movement of the stud with respect to the nut. Accordingly, the sheets or members 10 and 11 may be moved out of contact. If, thereafter, it is desired to completely remove the stud from the sheet 10, this may of course be accomplished by manipulating the tongues 19 so that they clear the projections 20. Thereafter, the retaining plate 18 may be entirely withdrawn from the stud. This, however, will not normally be desirable.

Now referring to Figs. 7 to 11 inclusive, it will be seen that a construction in many respects similar to that heretofore described has been illustrated. It will be observed, however, that in lieu of the rod or wire 20 used to provide the projecting portions, ears 41 are furnished. The formation of these ears is preferably achieved by squeezing or striking out material at points adjacent which the ears are to extend. Similarly to the construction heretofore described, the distance between the outer ends of these ears is greater than the distance between the inner edges of the tongues or tabs 19. It follows that the retainer plate 18 may be slid along the shank of the stud to a point at which its tongues or tabs override the ears 41. Such procedure is, of course, resorted to after the stud has been associated with the plate or sheet 10.

Rotatably supported upon the flange 26 of the nut and extending into the bore of the same is a lock plate or sleeve 42. As especially shown in Fig. 9 and indicated by the reference numeral 43, a portion of the edge of this plate or sleeve may be reduced through a given arc. A tab or tongue 44 may be struck up from the flange 26 of the nut and ride within the recess 43. Accordingly, in cooperation with the end edges of the latter, a stop structure is furnished which will limit the rotational movements of the lock or detent plate 42 with respect to the nut.

Similarly to the construction heretofore described, the outer face of the flange 26 may also be formed with a series of radially extending grooves 44' which are preferably spaced 90° apart. The plate 42 may be outstruck to provide detent elements 45 at diametrically opposite points of this body. These detents—in the form of ribs—may selectively engage within the grooves 44' of the nut when the plate is rotated to either of its extreme positions with reference to the nut. Consequently, a restraining structure is furnished which normally prevents movements of the plate with respect to the nut.

A spring conveniently in the form of a quadrangular bowed member 46 bears against the outer face of plate 42 as shown especially in Figs. 10 and 11. Accordingly, this spring tends to maintain the plate in constant contact with the flange 26 of the nut and also tends to maintain the nut in contact with the face of the casing and project it as shown in Fig. 10. The ends of the spring will—as shown in these figures—bear against inwardly extending, or flange portions 47 forming a part of the shell or casing. Under these circumstances, the detent structure will at all times be operative and a restraint will be placed upon relative rotation of the parts.

If desired and as shown in Fig. 7, a spacer plate 48 may be interposed between the shell and the plate 11 or its equivalent. This spacer plate may be secured as a unit with the shell by, for example, disposing eyelets 49 in line with the openings 21' of the ears or end portions of the casing and passing these eyelets through aligned openings 48' in the spacer plate. Thereafter, the eyelets are flanged or crimped 49'' to secure the parts against detachment. When mounting a unit of this type the rivets 23 are simply passed through the bores defined by the eyelets and the openings in the sheet 11 or its equivalent. Accordingly, the parts may be fixedly mounted.

In certain instances, it may be desirable to increase the strength of the locking plate by forming the latter with detent portions which, contrary to the structure shown in Fig. 9, are non-aligned with the ends of the stud-accommodating slot. Also, it may be desirable to provide an alternative form of stop structure. With these thoughts in mind and as shown in Fig. 13, the flange 49' of the nut may be formed with radially extending grooves or depressions 51 corresponding to the grooves 44' as in Fig. 9. Also, tongues 50 (spaced 90° apart) may be struck up from the nut portion or flange 49'.

Rotatably supported upon this nut is the locking plate 52 as shown in Fig. 12. This plate is formed with the usual slot 53, and has its edge reduced preferably through an arc in excess of 180°. This results in an annular edge portion 54, the ends of which are defined by stop elements or edges. The detent portions 55 of this plate preferably extend perpendicular to the side edges of the slot 53. Accordingly, a maximum amount of plate material will exist between the inner ends of these detent portions and the slot.

With the plate shown in Fig. 12 rotatably mounted upon the nut illustrated in Fig. 13, it is apparent that any desired encasing and spring structures may be employed. The detents 55 will alternatively cooperate with one of the pairs of grooves 51. Rotational movement of the parts will be limited to substantially 90°. This will be because the stops defined at the ends of the edge portion 54 will bear against or lie adjacent one of the pairs of tongues 50. Therefore, the plate 52 will normally be locked in a position where the end edges of its slot 53 are in line with the interruptions of the thread portions of the nut, or where the ends of such slot are aligned with the zones of these thread portions.

Thus, it is apparent that among others the several objects of the invention as specifically aforenoted are achieved. Obviously, numerous changes in construction and rearrangements of the parts might be resorted to without departing from the spirit of the invention as defined by the claims.

I claim:

1. In a fastener assembly, a headed stud including a shank formed with interrupted threads, said shank being adapted to extend through the aperture of a mounting member, retaining means mounted by said shank and to bear against the face of said mounting member to prevent removal of said stud therefrom, said means comprising a plate larger than said aperture, an opening in said plate to receive said shank, a resilient, deformable tongue forming a part of said retaining means and extending adjacent said shank into said opening, a projection extending from the shank and engageable by said tongue; said tongue being displaceable to permit said retaining means to clear said projections when mounting said retaining means upon said shank.

2. A stud-receptacle assembly for a fastener, said assembly including a nut, a housing formed with an opening through which said nut projects, a flange member extending from said nut and within said housing, a plate member rotatably mounted by said flange and formed with a slot to permit passage of a stud shank, one of said members being formed with radially extending grooves, and ribs extending from the second of said members and into said grooves to restrain relative rotation of said members when the latter are in predetermined positions.

3. A stud-receptacle assembly for a fastener, said assembly including a nut, a housing formed with an opening through which said nut projects, a flange extending from said nut and within said housing, a plate rotatably mounted by said flange and formed with a slot to permit passage of a stud shank, a spring acting against said plate and nut to maintain the latter in assembled relationship, and a spacer member disposed within said housing, said spring also bearing against said spacer member.

4. A stud-receptacle assembly for a fastener, said assembly including a nut, a housing formed with an opening through which said nut projects, a flange extending from said nut and within said housing, the inner face of said housing and the adjacent edges of said nut presenting curved cooperative surfaces.

5. A stud-receptacle assembly for a fastener, said assembly including a housing formed with an opening, a nut body projecting through said opening, a flange and a flared portion forming a part of said nut, said flared portion extending between the body and said flange, and a locking plate rotatably supported upon the flange of said nut and presenting a tapered body lying adjacent the flared portion thereof.

6. A stud-receptacle assembly for a fastener, said assembly including a housing formed with an opening, a nut body projecting through said opening, a flange and a flared portion forming a part of said nut, said flared portion extending between the body and said flange, a locking plate rotatably supported upon the flange of said nut, and presenting a tapered body lying adjacent the flared portion thereof, and detent means cooperating with said plate and nut to normally maintain the latter in predetermined positions with respect to each other.

7. A stud-receptacle assembly for a fastener, said assembly including a housing formed with an opening, a nut body projecting through said opening, a flange and a flared portion forming a part of said nut, said flared portion extending between the body and said flange, and a locking plate rotatably supported upon the flange of said nut, and presenting a tapered body lying adjacent the flared portion thereof, both said tapered and flared portions being slotted to permit of the passage of a stud shank, and detent means cooperating with said plate and nut to normally maintain the latter in predetermined positions with respect to each other.

8. A fastener assembly including in combination a stud member comprising a flattened shank formed with screw threads in its outer edges, a nut including a body and a detent plate rotatably mounted by said body, said plate being formed with a slot permitting the passage of said shank but preventing relative rotation of the shank with respect to the same, said nut being formed with interruptions in its threads, and radially extending ribs and cooperating grooves formed in said plate and nut to prevent relative rotation of the same.

9. A stud-receptacle assembly for a fastener, said assembly including, in combination, a nut member, a lock plate member rotatably supported thereon, a tab extending from one of said members, the second of said members being formed with an arcuate recess on its circumference and within which said tab rides, and said tab, in conjunction with the end walls of said recess, providing a stop structure limiting the rotational movement of said plate member with respect to said nut member.

10. A stud-receptacle assembly for a fastener, said assembly including, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, one of said members being formed with a series of radially extending grooves, and ribs forming a part of the second of said members and extendable into said grooves to promote a detent structure.

11. A stud-receptacle assembly for a fastener, said assembly including, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, one of said members being formed with a series of radially extending grooves, ribs forming a part of the second of said members and extendable into said grooves to provide a detent structure, a shell formed with an opening through which said nut member extends, a spring bearing against said plate to cause the latter to engage said nut and to also cause said nut to bear against said shell, and inwardly extending flange portions forming a part of said shell and supporting said spring.

12. A stud-receptacle assembly for a fastener, said assembly including, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, one of said members being formed with a series of radially extending grooves, ribs forming a part of the second of said members and extendable into said grooves to provide a detent structure, a shell formed with an opening through which said nut member extends, a spring bearing against said plate to cause the latter to engage said nut and to also cause said nut to bear against said shell, a spacer plate disposed against said shell, said spring bearing against said spacer plate, and means for securing said spacer plate and shell against movements with respect to each other.

13. In a fastener assembly, in combination, a nut member, a lock plate member rotatably supported thereon, a tab extending from one of said members, the second of said members being formed with an arcuate recess on its circumference and within which said tab rides, said tab, in conjunction with the end walls of said recess, providing a stop structure limiting the rotational movement of said plate member with respect to said nut member, a stud to extend through an opening in said plate and into the bore of said nut, integral ear portions forming a part of said stud and extending beyond the body of the same, and stud-retaining means slidably mounted upon said stud and secured against displacement with respect to the same by said ears.

14. A stud-receptacle assembly for a fastener, said assembly including, in combination, a nut, a lock plate rotatably supported thereon, the edge of said plate being reduced throughout a portion of its length to provide an arcuate recess, and a tab extending upwardly from said nut and integral therewith to lie within said recess and, in cooperation with the end edges thereof, to limit rotational movements of said nut and lock plate.

15. A stud-receptacle assembly for a fastener, said assembly including, in combination, a nut, a lock plate rotatably supported thereon, said nut being formed with a radial series of grooves, radially extending ribs projecting from the adjacent face of the plate, and means for causing cooperation between said grooves and ribs to provide a detent structure.

16. A stud-receptacle assembly for a fastener, said assembly including a stud-accommodating member and also including a hollow body comprising an end wall and side walls, and perforated ear portions extending from said side walls, a spacer plate formed with perforations in line with the perforated ear portions of said shell, and eyelets extending through both of said perforations to secure said plate and shell against detachment.

GEORGE CANNOVA.